United States Patent
Schmidt et al.

(10) Patent No.: US 12,012,978 B2
(45) Date of Patent: Jun. 18, 2024

(54) HYDRAULIC CARTRIDGE VALVE WITH POSITION MONITORING MECHANISM AND HYDRAULIC CONTROL SYSTEM AND METHOD

(71) Applicant: HydraForce, Inc., Lincolnshire, IL (US)

(72) Inventors: Travis Schmidt, Oregon City, OR (US); David Ruxton, Colorado Springs, CO (US); Thomas Ptak, Denver, CO (US); Scott Wickboldt, Vernon Hills, IL (US)

(73) Assignee: HydraForce, Inc., Lincolnshire, IL (US)

( * ) Notice: Subject to any disclaimer, the term of this patent is extended or adjusted under 35 U.S.C. 154(b) by 181 days.

(21) Appl. No.: 17/176,733

(22) Filed: Feb. 16, 2021

(65) Prior Publication Data
US 2021/0254641 A1 Aug. 19, 2021

Related U.S. Application Data

(60) Provisional application No. 62/976,750, filed on Feb. 14, 2020.

(51) Int. Cl.
| | | |
|---|---|---|
| *F15B 15/28* | (2006.01) | |
| *F16K 3/00* | (2006.01) | |
| *F16K 31/06* | (2006.01) | |
| *F16K 37/00* | (2006.01) | |

(52) U.S. Cl.
CPC ............ *F15B 15/2861* (2013.01); *F16K 3/00* (2013.01); *F16K 31/06* (2013.01); *F16K 37/0041* (2013.01)

(58) Field of Classification Search
CPC ........ F15B 15/2861; F16K 3/00; F16K 31/06; F16K 37/0041
See application file for complete search history.

(56) References Cited

U.S. PATENT DOCUMENTS

| | | | |
|---|---|---|---|
| 4,628,499 A | 9/1986 | Hammett | |
| 4,725,039 A * | 2/1988 | Kolchinsky | F16K 31/0668 137/454.2 |
| 4,790,345 A * | 12/1988 | Kolchinsky | F16K 31/0668 335/262 |
| 5,423,347 A * | 6/1995 | Weber | F15B 13/015 251/30.04 |

(Continued)

FOREIGN PATENT DOCUMENTS

| | | |
|---|---|---|
| DE | 102006049724 A1 | 4/2008 |
| DE | 102011116393 B3 | 1/2013 |
| WO | WO 2005/098299 A1 | 10/2005 |

OTHER PUBLICATIONS

European Patent Office, International Search Report and the Written Opinion in International Application No. PCT/US2021/018223 (dated Jun. 25, 2021).

*Primary Examiner* — Angelisa L. Hicks
(74) *Attorney, Agent, or Firm* — Leydig, Voit & Mayer, Ltd.

(57) ABSTRACT

A hydraulic cartridge valve includes a movable member and a position monitoring mechanism configured to detect the position of the movable member. The position monitoring mechanism is adapted to generate a position signal indicative of the position of the movable member. The position monitoring mechanism can be in the form of a linear variable differential transformer (LVDT).

8 Claims, 2 Drawing Sheets

(56) References Cited

U.S. PATENT DOCUMENTS

| | | | |
|---|---|---|---|
| 6,267,349 B1 | 7/2001 | Gomes et al. | |
| 8,672,291 B2 * | 3/2014 | Tyler | H01F 7/1607 251/129.15 |
| 2007/0241298 A1 * | 10/2007 | Herbert | F16K 37/0041 251/129.04 |
| 2011/0062356 A1 * | 3/2011 | Pogel | H01F 7/1607 251/129.01 |
| 2017/0371478 A1 * | 12/2017 | Hirai | G06F 3/044 |
| 2020/0003324 A1 | 1/2020 | Zähe | |

* cited by examiner

HYDRAULIC CARTRIDGE VALVE WITH POSITION MONITORING MECHANISM AND HYDRAULIC CONTROL SYSTEM AND METHOD

CROSS-REFERENCE TO RELATED APPLICATIONS

This patent application claims the benefit of priority to U.S. Provisional Patent Application No. 62/976,750, filed Feb. 14, 2020, and entitled, "Hydraulic Cartridge Valve With Position Monitoring Mechanism and Hydraulic Control System and Method," which is incorporated in its entirety herein by this reference.

TECHNICAL FIELD

This patent disclosure relates generally to a hydraulic cartridge valve and, more particularly, to a hydraulic cartridge valve including a movable member and a position monitoring mechanism configured to detect the position of the movable member.

BACKGROUND

In many hydraulic valve applications, the output through a valve is dependent upon a position of a movable member of the valve. Under certain conditions, a desired set point for the movable member to deliver a desired output can be determined. It can be difficult to repeatably place the movable member in the desired set point over a range of conditions. This can be particularly true in applications where a set of control valves are used in a system, and the tolerances of each valve stack up together. Tuning the hydraulic system to attempt to reduce such issues can be time consuming and difficult.

There is a continued need in the art to provide additional solutions to enhance the use and control of hydraulic cartridge valves over a range of conditions. For example, there is a continued need for techniques for operating a hydraulic cartridge valve such that it operates at a predetermined set point over a range of conditions to provide a desired flow therethrough.

It will be appreciated that this background description has been created by the inventors to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

The present disclosure, in one aspect, is directed to embodiments of a hydraulic cartridge valve. In embodiments, a hydraulic cartridge valve includes a movable member and a position monitoring mechanism configured to detect the position of the movable member. The position monitoring mechanism is adapted to generate a position signal indicative of the position of the movable member.

In one embodiment, a hydraulic cartridge valve includes a valve body, a movable member, and a position monitoring mechanism. The valve body defines an internal valve cavity. The movable member is axially movable over a range of travel with respect to the valve body. The movable member is at least partially disposed within the internal valve cavity over the range of travel. The position monitoring mechanism is arranged with the movable member and is configured to detect a position of the movable member over the range of travel and to transmit a position signal indicative of the position of the movable member detected by the position monitoring mechanism.

In still another aspect, embodiments of a hydraulic control system are disclosed. In embodiments, a hydraulic control system includes a controller and a hydraulic cartridge valve in operable arrangement with the controller. The hydraulic cartridge valve includes a movable member, an actuator configured to move the movable member over a range of travel, and a position monitoring mechanism configured to detect the position of the movable member and to transmit a position signal to the controller indicative of the position of the movable member. The controller is configured to control the actuator to variably adjust the position of the movable member in response to the position signal received from the position monitoring mechanism.

In one embodiment, a hydraulic control system includes a controller and a hydraulic cartridge valve. The hydraulic cartridge valve is in operable arrangement with the controller. The hydraulic cartridge valve includes a valve body, a movable member, an actuator, and a position monitoring mechanism. The valve body defines an internal valve cavity. The movable member is axially movable over a range of travel with respect to the valve body. The movable member is at least partially disposed within the internal valve cavity over the range of travel. The actuator is arranged with the movable member and is configured to selectively move the movable member over the range of travel. The position monitoring mechanism is arranged with the movable member and is configured to detect a position of the movable member over the range of travel and to transmit to the controller a position signal indicative of the position of the movable member detected by the position monitoring mechanism. The controller is configured to control the actuator to adjust the position of the movable member in response to the position signal received from the position monitoring mechanism.

In yet another aspect, embodiments of a method of controlling a hydraulic cartridge valve are disclosed. In one embodiment, a method of controlling a hydraulic cartridge valve includes transmitting, by a position monitoring mechanism of a hydraulic cartridge valve, a position signal to a controller. The position signal is indicative of a position detected by the position monitoring mechanism of a movable member of the hydraulic cartridge valve. The movable member is axially movable over a range of travel with respect to a valve body of the hydraulic cartridge valve. The controller monitors the position signal to determine whether the movable member is detected to be at a desired set point. The controller selectively operates, based upon the position signal, an actuator of the hydraulic cartridge valve to axially move the position of the movable member to the desired set point.

Further and alternative aspects and features of the disclosed principles will be appreciated from the following detailed description and the accompanying drawings. As will be appreciated, the hydraulic cartridge valves, the hydraulic control systems, and methods disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

Figure 1:
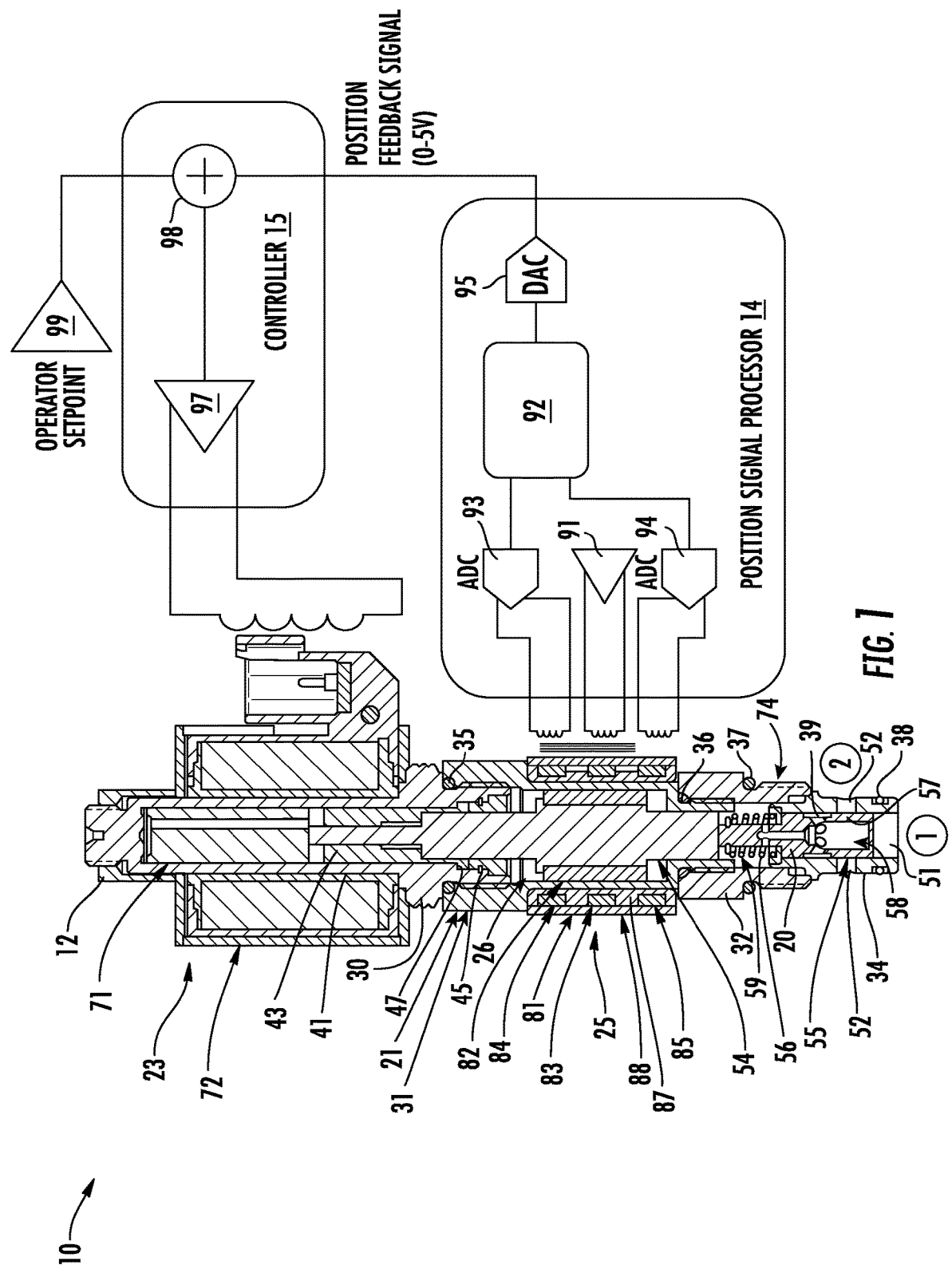
FIG. 1 is a generally schematic view of an embodiment of a hydraulic control system constructed in accordance with principles of the present disclosure, the hydraulic control system including an embodiment of a hydraulic cartridge valve, shown in a sectional elevation view, constructed in accordance with principles of the present disclosure and including an actuator in the form of a solenoid assembly and a position monitoring mechanism in the form of a linear variable differential transformer (LVDT).

It should be understood that the drawings are not necessarily to scale and that the disclosed embodiments are illustrated diagrammatically and in partial views. In certain instances, details which are not necessary for an understanding of this disclosure or which render other details difficult to perceive may have been omitted. It should be understood that this disclosure is not limited to the particular embodiments illustrated herein.

DETAILED DESCRIPTION OF EXEMPLARY EMBODIMENTS

Embodiments of a hydraulic control system constructed in accordance with principles of the present disclosure are adapted to control the operation of one or more hydraulic valves in the form of screw-in or threaded cartridge valves constructed according to principles of the present disclosure. Embodiments of a hydraulic control system constructed in accordance with principles of the present disclosure can monitor the position of an internal movable member of the hydraulic cartridge valve via a linear displacement sensor that is mounted or integral to the valve.

Embodiments of a method of controlling a hydraulic cartridge valve following principles of the present disclosure can be used to actively monitor the position of an internal movable member (e.g., a spool or poppet) of a threaded or screw-in hydraulic cartridge valve and to control the valve to move the movable member to a desired set point. Techniques and principles of the present disclosure can be used for valve monitoring within a variety of applications, such as "internet of things" (IoT) applications, machine automation, global positing system (GPS) steering systems, or other systems requiring additional safety.

Embodiments of a hydraulic cartridge valve constructed according to principles of the present disclosure can include a movable member and a position monitoring mechanism configured to detect the position of the movable member and to transmit a position signal to a controller configured to variably adjust the position of the movable member in response to the position signal received from the position monitoring mechanism. Embodiments of a hydraulic cartridge valve constructed according to principles of the present disclosure can have a wide variety of different forms, as will be appreciated by one skilled in the art. For example, in embodiments, a hydraulic cartridge valve constructed according to principles of the present disclosure can be, for example, in the form of: a relief valve; a sequence valve; a pressure-reducing valve; a check valve; a pilot-operated check valve; a load-control valve; a counterbalance valve; a flow-control valves (pressure- and non-pressure-compensated, fixed, priority, proportional divider); a solenoid valves in 2- or 3-way poppet or spool type, 4-way and 5-way, 2- or 3-position versions; and electro-proportional directional, flow, and pressure controls.

Embodiments of a hydraulic cartridge valve constructed according to principles of the present disclosure can be easily serviceable. For example, a threaded cartridge valve constructed according to principles of the present disclosure can be easily removed and replaced as part of an efficient service program.

Turning now to the Figures, an embodiment of a hydraulic control system 10 constructed according to principles of the present disclosure is shown in FIG. 1. The illustrated hydraulic system 10 includes an embodiment of a hydraulic cartridge valve 12 constructed according to principles of the present disclosure, a position signal processor 14, and a controller 15 (also referred to as an electronic control unit (ECU). The hydraulic cartridge valve 12 includes a movable member 20 that is axially movable over a range of travel with respect to a valve body 21, an actuator 23 configured to selectively move the movable member 20, and a position monitoring mechanism 25 configured to detect the position of the movable member 20 over the range of travel. The position signal processor 14 is operably arranged with the position monitoring mechanism 25 of the hydraulic cartridge valve 12 and the controller 15.

In the illustrated embodiment, the hydraulic control system 10 is adapted to monitor the position of the movable member 20 of the hydraulic cartridge valve 12 and to selectively operate the actuator 23 of the hydraulic cartridge valve 12 based upon the position of the movable member 20 as determined by the position monitoring mechanism 25 to axially move the movable member 20 to a desired set point which can be selected by an operator via the controller 15. The position signal processor 14 is configured to interact with the position monitoring mechanism 25 of the hydraulic cartridge valve 12 to power the position monitoring mechanism 25 to produce the position signal indicative of the position of the movable member 20. The position signal processor 14 can be configured to transmit the position signal to the controller 15. The controller 15 is configured to selectively operate the actuator 23 of the hydraulic cartridge valve 12 in response to the position signal received from the position signal processor 14 to move the movable member 20 to the desired set point. In embodiments, the position signal processor 14 is configured to convert the position signal indicative of the position of the movable member 20 received from the position monitoring mechanism 25, which position signal is of one type, to a position signal of a different type that is more readily usable by the controller 15.

It will be understood that, in other embodiments, the hydraulic control system 10 can be configured to selectively and independently operate a plurality of hydraulic cartridge valves 12 constructed according to principles of the present disclosure. It will be understood that, in embodiments, the hydraulic control system 10 can include other and different components.

For example, in the illustrated embodiment, the hydraulic cartridge valve 12 and the position signal processor 14 are shown as separate components. That is, the illustrated hydraulic cartridge valve 12 comprises a first component, and the illustrated position signal processor 14 comprises a second component that is separate from the first component. In other embodiments, it will be understood that the position signal processor 14 can be integrated with the hydraulic cartridge valve 12 such that the components of the position signal processor 14 and the cartridge valve 12 comprise a single unit contained within a housing. Accordingly, it will be understood that references herein to the hydraulic cartridge valve 12 and to the position monitoring mechanism 25 can also include the functionality and components contained within the position signal processor.

The hydraulic cartridge valve 12 illustrated in FIG. 1 comprises a solenoid-operated, two-way, piloted, normally closed, poppet-type, proportional, screw-in hydraulic cartridge valve suitable for low-leakage blocking or load-holding applications. The hydraulic cartridge valve includes the movable member 20, the valve body 21, the actuator 23, and the position monitoring mechanism 25.

The valve body 21 defines an internal valve cavity 26. The movable member 20 is axially movable over a range of travel with respect to the valve body 21. In embodiments, the movable member 20 is at least partially disposed within the internal valve cavity 26 over the range of travel. The actuator 23 is arranged with the movable member 20 and is configured to selectively move the movable member 20 over the range of travel. The position monitoring mechanism 25 is arranged with the movable member 20 and is configured to detect a position of the movable member 20 over the range of travel and to transmit a position signal indicative of the position of the movable member 20 detected by the position monitoring mechanism 25.

In embodiments, the valve body 21 can have any configuration suitable for the intended application(s) of the hydraulic cartridge valve 12. In embodiments, the valve body 21 can be made from a plurality of components that are assembled together to define the internal valve cavity 26. In embodiments, the valve body 21 can be configured to facilitate the installation of the hydraulic cartridge valve 12 in a body, manifold or other suitable component.

In the illustrated embodiment, the valve body 21 includes a tube assembly 30, a nonmagnetic pressure vessel 31, an adapter 32, and a cage 34. A plurality of seal members 35, 36, 37, 38 are provided to help provide a sealing arrangement between the valve body 21 and the structure to or into which the hydraulic cartridge valve 12 is mounted.

The tube assembly 30 is threadedly engaged with the nonmagnetic pressure vessel 31. The nonmagnetic pressure vessel 31 is threadedly engaged with the tube assembly 30 and the adapter 32 such that the pressure vessel 31 is interposed therebetween. The adapter 32 is threadedly engaged with the pressure vessel 31 and the cage 34 such that the adapter 32 is interposed therebetween. The adapter 32 includes an external threaded surface 39 that is adapted to be threadedly engaged with a body, manifold, or other suitable component to allow the hydraulic cartridge valve 12 (and the hydraulic control system 10) to be used in a hydraulic circuit. The cage 34 is threadedly engaged with the adapter 32. The tube assembly 30, the pressure vessel 31, the adapter 32, and the cage 34 are hollow and cooperate together to define the internal valve cavity 26 in the form of an axial bore. The seal members 35, 36, 37, 38 can have any suitable form and construction, such as suitable O-ring seals, to provide hydraulic isolation and/or seals to inhibit leakage, as appropriate and as will be understood by one skilled in the art.

The tube assembly 30 can include a hollow tube portion 41 and a plug portion 43 disposed within the valve cavity 26. The plug portion 43 can be provided within the tube portion 41, and can be configured, to limit the movement of the actuator 23 to a predetermined range of axial travel. In the illustrated embodiment, the plug portion 43 comprises two pieces that are retained with respect to the tube portion 41 via a captured engagement provided by a retaining ring 45 and a shoulder 47 of the tube portion 41.

The cage 34 is hollow and is configured to be inserted into a cavity formed in a suitable housing and can be adapted for connection with the cartridge valve 12 such that the valve 12 is in fluid communication with a hydraulic circuit within which the hydraulic control system 10 is intended to be used. The cage 34 of the cartridge valve 12 defines a first port$_1$ and a second port$_2$ in fluid communication with the first port$_1$ via the axial bore 26 defined by the valve body 21. The cage 34 has an axial bore 51 that defines the first port$_1$ and a plurality of cross-holes 52 arranged in a row and disposed in spaced relationship to each other around the radial circumference of the cage 34 that defines the second port$_2$. It should be understood that the names used herein for the ports defined by the cage 34 are used for convenient reference only and should not be construed to limit the operation of the ports or the nature of the fluid flow (in either direction) through the ports of the cage 34.

In embodiments, the movable member 20 can be any suitable movable component or components of the hydraulic cartridge valve 12 whose change in position can vary the operational condition of the hydraulic cartridge valve 12. The illustrated movable member 20 is disposed within the axial bore 26 defined by the valve body 21 and is configured to move axially over a range of travel with respect to the valve body 21, including with respect to the pressure vessel 31, the adapter 32, and the cage 34.

In the illustrated embodiment, the movable member 20 includes a nonmagnetic valve plunger 54 and a valve metering spool 55. The valve plunger 54 and the spool 55 are coupled together such that the engaged movement of the valve plunger 54 toward the spool 55 causes the spool 55 to move, as well, and the engaged movement of the spool 55 toward the valve plunger 54 causes the valve plunger 54 to move. The valve plunger 54 is disposed within the tube assembly 30, the pressure vessel 31, and the adapter 32. The spool 55 is disposed within the adapter 32 and the cage 34.

The metering spool 55 is slidably disposed within the cage 34 such that it is axially movable over a range of travel between a closed position, shown in FIG. 1 and in which the metering spool 55 prevents fluid flow from the second port$_2$ to the first port$_1$, and an open position, in which the spool 55 is disposed closer to the first port$_1$ than as is shown in FIG. 1 and in which the metering spool 55 defines a fluid flow path between the second port$_2$ and the first port$_1$ of the cage.

In embodiments, a biasing member 56 can be provided to bias the metering spool 55 to one of the closed position and the open position. In the illustrated embodiment, a biasing member in the form of a spring 56 is arranged with the metering spool 55 to bias the spool 55 to the closed position, as shown in FIG. 1.

The spool 55 includes a blocking portion 57 that is sealingly engaged with the interior of the cage 34 such that, when the spool 55 is in the closed position in FIG. 1, the blocking portion 57 sealingly occludes the row of metering cross holes 52 to prevent fluid flow from the second port$_2$ to the first port$_1$. The spool 55 defines an axial passage 58 that permits fluid flow from the first port$_1$ to a spring chamber 59 in which the biasing spring 56 is disposed.

In embodiments, the actuator 23 can be any suitable mechanism configured to selectively move the movable member 20 to vary its position. In the illustrated embodiment of FIG. 1, the actuator 23 is in the form of a solenoid assembly and includes a valve driving coil 71 disposed around a valve actuator 72. In embodiments, the solenoid assembly 23 is configured such that, when the valve driving coil 71 is energized, the metering spool 55 moves from the closed position toward the open position in an amount proportional to the electrical current applied to the valve driving coil 71.

In the illustrated embodiment, the valve driving coil 71 is mounted to the tube assembly 30, and the valve actuator 72 is disposed within the axial bore 26 of the valve body 21. The valve actuator 72 is associated with the valve driving coil 71 such that operation of the actuator 23 by the controller 15 can selectively move the valve actuator 72. The valve actuator 72 is configured to move in response to an electrical current being applied to the driving coil 71, and the valve actuator 72 is arranged with the nonmagnetic plunger 54 such that the movement of the valve actuator 72 moves the movable member 20.

The valve driving coil 71 can be mounted to the tube assembly 30 using any suitable technique as will be familiar to one skilled in the art. In the illustrated embodiments, the valve driving coil 71 is threadedly mounted to the tube assembly 30. The valve driving coil 71 is operably arranged with the controller 15 such that the controller 15 can selectively actuate the valve driving coil 71 by applying electrical current thereto.

The valve actuator 72 is movably disposed within the portion of the axial bore 26 defined by the tube assembly 30 and is axially aligned with the valve driving coil 71. The valve actuator 72 is configured to move toward the cage 34 in response to the excitation of the valve driving coil 71 when an electrical current is applied thereto. The valve actuator 72 is arranged with the nonmagnetic valve plunger 54 such that the movement of the valve actuator 72 toward the cage 34 can act to move the valve plunger 54 (and, in turn, the spool 55).

In the illustrated embodiment, the tube assembly 30, the valve driving coil 71, and the valve actuator 72 comprise the solenoid assembly 23. The geometry and material properties of the plug portion 43 and the valve actuator 72 cooperate to help determine the magnetic force characteristic of the solenoid assembly 23. The solenoid assembly 23 has a proportional characteristic such that the magnetic attractive force between the valve actuator 72 and the plug portion 43 is proportional to the current applied to the valve driving coil 71.

In the illustrated embodiment, when the actuator 23 is de-energized, the spool 55 of the cartridge valve 12 blocks flow from the second port$_2$ to the first port$_1$. In this mode, the cartridge valve 12 can allow flow from the first port$_1$ to the second port$_2$ after overcoming the spring force of the biasing spring 56. When the actuator 23 is energized, the spool 55 of the cartridge valve 12 can move from the closed position to any position between the closed position and the fully open position to allow flow proportional to the current applied to the valve driving coil 71 from the second port$_2$ to the first port$_1$ while restricting flow from the first port$_1$ to the second port$_2$.

When the pressure in the spring chamber 59 exceeds the spring force generated by the spring 56, the spool 55 can move toward the open position to allow flow from the first port$_1$ to the second port$_2$ even though the actuator 23 is de-energized. When the actuator 23 is energized, a row of metering cross holes 74 defined in the spool 55 can be placed in fluid communication with the second port$_2$ such that flow from the second port$_2$ to the first port$_1$ is permitted.

In embodiments, the position monitoring mechanism 25 is configured to detect the position of the movable member 20 over its range of travel and to generate an output suitable for use in using the detected position of the movable member 20 to adjust the position of the movable member 20 as needed to position the movable member 20 in a desired set point. In embodiments, the position monitoring mechanism 25 is configured to convert a position or linear displacement of the movable member 20 of the cartridge valve 12 relative to a reference (zero or null) position into a proportional electrical signal containing phase (for direction) and amplitude (for distance) information.

In embodiments, the position monitoring mechanism 25 can comprise any suitable sensor suitable for the intended purpose of detecting the position of the movable member 20 and transmitting a position signal indicative of the detected position. In embodiments, the position monitoring mechanism 25 can be any suitable electromechanical transducer that is configured to convert the motion of the movable member (e.g., a metering spool 55) into a corresponding electrical signal.

In the illustrated embodiment, the position monitoring mechanism 25 is arranged with the movable member 20 and is configured to detect a position of the movable member 20 over the range of travel and to transmit to the controller 15 a position signal indicative of the position of the movable member 20 detected by the position monitoring mechanism 25. The illustrated position monitoring mechanism 25 is in the form of a linear variable differential transformer (LVDT).

The illustrated LVDT includes the nonmagnetic pressure vessel or tube 31, an LVDT coil 81, and a magnetic target 82. In embodiments, the LVDT coil 81 comprises a stationary element of the position monitoring mechanism 25, and the magnetic target 82 comprises a relatively movable element of the position monitoring mechanism 25. The LVDT coil 81 is mounted to the external surface of the nonmagnetic pressure vessel 31. The magnetic target 82 is disposed within the nonmagnetic pressure vessel 31 and is coupled to the movable member 20 (the nonmagnetic valve plunger 54 in the illustrated embodiment) such that movement of the movable member 20 correspondingly moves the magnetic target 82. Within the nonmagnetic pressure vessel 31, the magnetic target 82 is moved up or down in response to the action of the movable member 20.

In embodiments, the target 82 can be made from any suitable magnetically permeable material, such as, a suitable magnetic steel, for example. In the illustrated embodiment, the target 82 is coupled to the valve plunger 54, which in turn is engaged with the spool 55.

Figure 2:
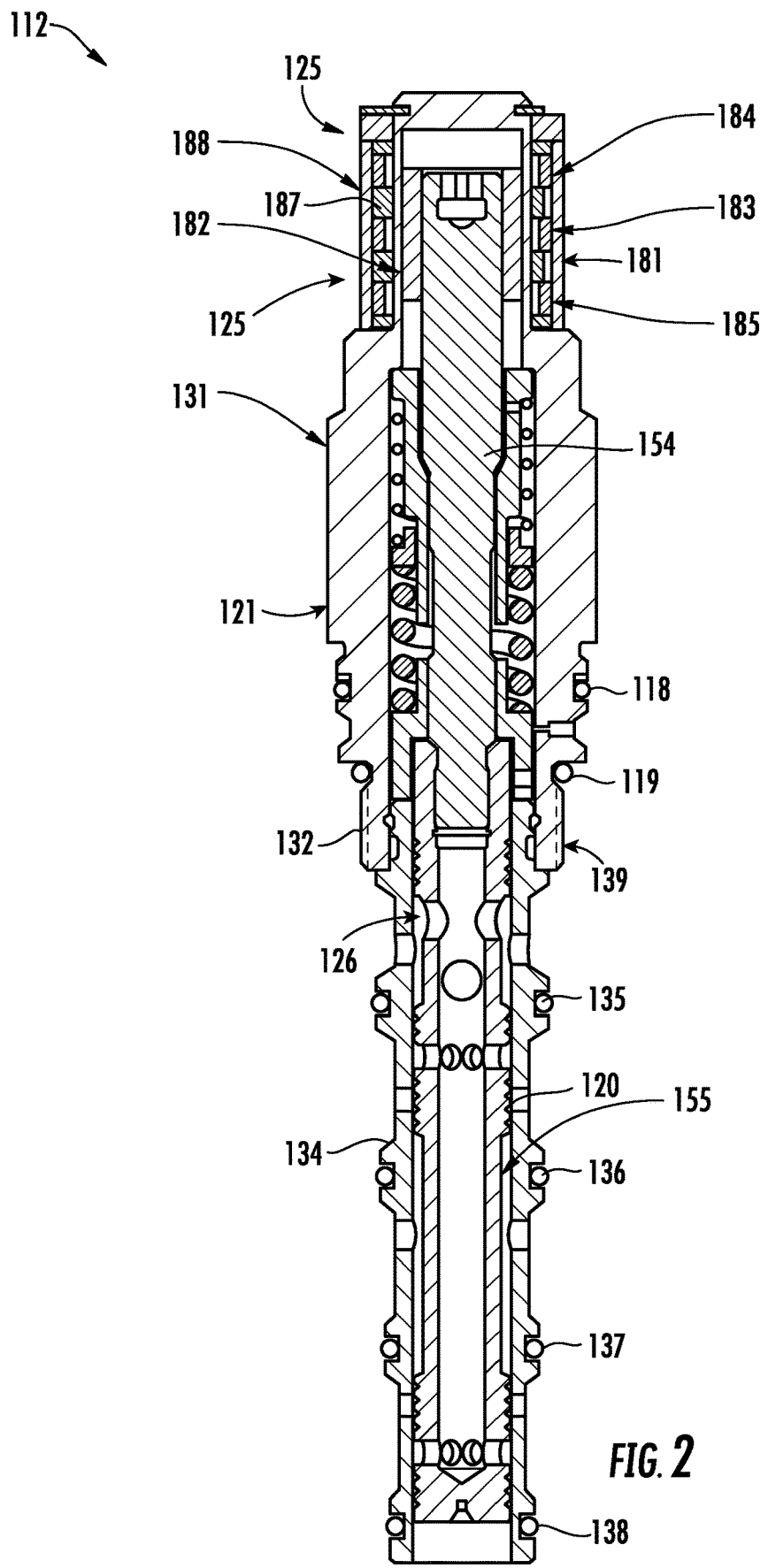
FIG. 2 is a sectional elevation view of another embodiment of a hydraulic cartridge valve constructed in accordance with principles of the present disclosure and including a position monitoring mechanism in the form of an LVDT.

The valve plunger 54 and the pressure vessel 31 can be made from any suitable nonmagnetic material (e.g., nonmagnetic stainless steel) in order to allow the LVDT coil 81 to more accurately track the movement of the target 82. In embodiments, the pressure vessel 31 and the valve plunger 54 can be made from any suitable nonmagnetic material in order to help allow the movement of the magnetic target 82 to create a flux differential in the LVDT coil 81. In embodiments, the nonmagnetic pressure vessel 31 can be positioned in any suitable location, such as, on top of a piloted spool valve 112, as shown in FIG. 2, or between the electrical actuator 23 and the movable member 20 (e.g., the spool/poppet portion) of the electrohydraulic cartridge valve 12, as shown in FIG. 1.

In embodiments, the nonmagnetic pressure vessel 31 can be fully pressurized to the rated pressure of the cartridge valve 12. In embodiments, the LVDT coil 81 is internally pressurized and forms part of the pressure vessel 31 of the valve 12 itself. As such, no moving components inside the valve 12 need to be passed through dynamic seals, thereby placing a reduced amount of parasitic load and damping on the moving components of the valve and reducing external leak points.

In the illustrated embodiment, the LVDT coil 81 includes three solenoid coils 83, 84, 85 placed end-to-end around a bobbin 87: a primary excitation coil 83, a first secondary sense coil 84, and a second secondary sense coil 85. The center coil comprises the primary excitation coil 83. The two outer coils comprise top and bottom secondary sense coils 84, 85. The primary excitation coil 83 is axially centered between the first and second secondary sense coils 84, 85. In embodiments, the primary excitation coil 83 is axially centered between a pair of identically wound secondary sense coils 84, 85 that are symmetrically spaced about the primary excitation coil 83. The bobbin 87 can be made from any suitable material, such as, for example, a suitable plastic (e.g., a suitable glass reinforced polymer). In embodiments, the coil windings 83, 84, 85 are encapsulated against moisture and wrapped in a high permeability magnetic shield. In the illustrated embodiment, the bobbin 87 and the coil windings 83, 84, 85 are secured in a cylindrical stainless steel cylindrical shell 88.

In embodiments, the position monitoring mechanism 25 is configured to convert the position of the movable member 20 relative to a reference position into a proportional electrical signal containing phase and amplitude information. In embodiments, the LVDT coil 81 is configured to indicate a direction of movement of the magnetic target 82 via a flux differential between the first and second secondary sense coils 84, 85 and the induced voltage therein caused by the movement of the magnetic target 82 relative to the LVDT coil 81. In embodiments, the LVDT coil 81 can be installed such that the center primary excitation coil 83 is axially aligned with the center of the magnetic target 82 when the metering spool 55 is in a normal position with the actuator de-energized, such as the closed position as shown in the embodiment illustrated in FIG. 1.

In operation, the LVDT coil's primary winding 83 is energized by alternating current of appropriate amplitude and frequency, known as the primary excitation, provided by the position signal processor 14. The LVDT's electrical output signal is the differential AC voltage between the two secondary windings 84, 85, which varies with the axial position of the target 82 with respect to the LVDT coil 81.

In embodiments, the position signal processor 14 is configured to generate an AC sinusoidal wave (for example 1.5V peak to peak, 2.5 kHz) that is used to energize the primary excitation coil 83. Since the primary winding 83 and the two secondary sense windings 84, 85 form an electrical transformer, a measurable amount of power is transmitted to the two secondary windings 84, 85. This power is proportional to the position of the magnetic target 82. In the illustrated embodiment, the position signal processor is configured to convert the AC output voltage to a suitable DC voltage that is compatible for use with the controller 15 (e.g., a DC voltage in a range between 0-5V).

In embodiments, the primary excitation winding 83 of the LVDT coil 81 is energized by a constant amplitude AC source from an oscillator 91 of the position signal processor 14. The magnetic flux thus developed is coupled by the target 82 to the adjacent secondary sense windings 84, 85. When the target 82 is located axially midpoint (also referred to as the "null point") between the secondary sense windings 84, 85, equal flux is coupled to each secondary sense winding 84, 85, and, thus, the voltages induced in the secondary sense windings 84, 85 are substantially equal so that the differential voltage output is substantially zero.

In embodiments, the position monitoring mechanism 25 is configured to indicate a direction of movement of the movable member 20 in the form of the magnetic target 82. For example, in embodiments, when the target 82 is moved closer to the upper secondary sense winding 84 than to the bottom secondary sense winding 85, more flux is coupled to the upper secondary sense winding 84 and less to the bottom secondary sense winding 85. As a result, the induced voltage of the upper secondary sense winding 84 is increased while the induced voltage of the bottom secondary sense winding 85 is decreased, resulting in a "positive" differential voltage that indicates upward movement of the spool 55. Conversely, if the target 82 is moved closer to the bottom secondary sense winding 85, more flux is coupled to the bottom secondary sense winding 85 and less to the upper secondary sense winding 84, so the induced voltage of the bottom secondary sense winding 85 is increased as the induced voltage of the upper secondary sense winding 84 is decreased, resulting in a "negative" differential voltage that indicates downward movement of the spool 55.

As the target 82 moves up toward the top secondary sense winding 84 or down toward the bottom secondary sense winding 85, that particular winding 84, 85 has a higher transformer power efficiency with respect to the center primary winding 83. In embodiments, the position signal processor 14 is configured to sample the output of the two outer secondary sense windings 84, 85 using any suitable technique selected from a number of different techniques, as will be appreciated by one skilled in the art, and compared. The difference in output and phase angle of the resulting sine wave is correlated to the position of the magnetic target 82 and, therefore, the position of the movable member 20 (the valve plunger 54 and the spool 55 in the illustrated embodiment).

Accordingly, in embodiments, when the target 82 is displaced from the null position toward the top secondary sense winding 84, the voltage in the top secondary winding 84 increases as the voltage in the bottom secondary winding 85 decreases. The resulting output voltage increases from zero. This voltage is in phase with the primary voltage. When the target 82 moves in the other direction, the output voltage also increases from zero, but its phase is opposite to that of the primary winding 83. The phase of the output voltage can be used to indicate the direction of the displacement (up or down), and the amplitude of the output voltage can be used to indicate the amount of displacement. In embodiments, the position monitoring mechanism 25 is configured to indicate an amplitude (or distance) of movement of the movable member based upon the magnitude of the differential output voltage which varies with the position of the target 82 (and, thus, the movable member 20).

The position signal processor 14 is configured to report to the controller 15 the position of the spool 55, by relaying the position signal thereto. The controller 15 is configured to actively move the position of the valve plunger 54 (and so the spool 55) to the desired set point based upon the position signal received from the position signal processor 14.

In embodiments, the position signal processor 14 is in operable arrangement with the position monitoring mechanism 25 and the controller 15. The position signal processor 14 can be configured to interact with the position monitoring mechanism 25 to power the position monitoring mechanism 25 to produce the position signal, and the position signal processor 14 can be configured to relay the position signal from the position monitoring mechanism 25 to the controller 15. In the illustrated embodiment, the position signal processor 14 is in operable arrangement with the LVDT coil 81 to apply an electrical current to the LVDT coil 81.

In embodiments, any suitable position signal processor 14 (also referred to as known as LVDT signal conditioning equipment) can be used. In embodiments, the position signal processor 14 can include a variety of LVDT signal conditioning electronics, including suitable commercially available models.

In embodiments, the position signal processor 14 is configured to energize the primary excitation coil 83 of the LVDT coil 81 via an alternating current. The position signal that the LVDT 25 is configured to provide comprises a differential AC voltage between the first and second secondary sense coils 84, 85, the differential AC voltage varying with the axial position of the magnetic target 82 with respect to the LVDT coil 81. In embodiments, the position signal processor 14 comprises any suitable equipment and components configured to generate AC power of an amplitude and frequency suitable for use with the LVDT coil 81 to operate according to its intended purpose.

In embodiments, the position signal processor 14 is configured to convert the position signal received from the position monitoring mechanism 25, which is of one type, to a second position signal, which is a type different from the type of position signal of the position monitoring mechanism 25. The second position signal is suitable for use with the controller 15 which is configured to selectively operate the actuator 23 of the hydraulic cartridge valve 12 in response to the second position signal received from the position signal processor 14 to move the movable member 20 axially to the desired set point. For example, in the illustrated embodiment, the position signal processor 14 includes suitable equipment configured to receive directional information from the LVDT coil 81 output in the form of AC voltage output and to convert the LVDT coil's AC voltage output into a DC position signal that is compatible for use with the controller 15.

In the illustrated embodiment, the position signal processor 14 includes the oscillator 91 and a demodulator 92. The oscillator 91 is configured to provide the alternating current for energizing the primary excitation winding 83 of the LVDT coil 81. In embodiments, the oscillator 91 is configured to provide a stable sine wave (in both amplitude and frequency) for driving the primary excitation winding 83 of the LVDT coil 81. The demodulator 92 is configured to convert the position signal from the LVDT coil 81 to a DC voltage proportional to the displacement of the magnetic target 82. In embodiments, the demodulator 92 is configured to amplify the output from the LVDT coil 81 and to convert it into a DC voltage which is directly proportional to displacement. ADC devices 93, 94 and a DAC device 95 can be provided to allow the demodulator 92 to operate effectively.

In embodiments, the controller 15 is configured to control the actuator 23 of the hydraulic cartridge valve 12 to adjust the position of the movable member 20 in response to the position signal received from the position monitoring mechanism 25. In embodiments, the controller 15 can be any suitable electronic control unit as will be readily familiar to one skilled in the art. For example, in embodiments, the controller 15 can be a suitable, commercially-available plug-in style, microprocessor based valve driver. In the illustrated embodiment, the controller 15 includes a valve driver 97 and a PID loop 98. The valve driver 97 is operably arranged with the valve driving coil 72 of the actuator 23 to selectively operate the cartridge valve 12. The PID loop 98 is configured to receive the position signal from the position signal processor and to operate the valve driver 97 in response to the position signal received to place/maintain the movable member 20 in the desired set point.

In embodiments, the controller 14 is configured to receive an input indicating the desired set point. For example, in embodiments, the controller 14 includes a suitable graphical user interface 99 configured to allow an operator to enter a desired set point for the cartridge valve 12.

Referring to FIG. 2, another embodiment of a hydraulic cartridge valve 112 constructed in accordance with principles of the present disclosure is depicted therein. The cartridge valve 112 comprises a pilot-operated, proportional hydraulic directional valve. The valve 112 is spring-centered and includes a symmetrical spool 155 to provide both meter-in and meter-out control.

The hydraulic cartridge valve 112 illustrated in FIG. 2 includes a movable member 120 that is axially movable over a range of travel with respect to a valve body 121 and a position monitoring mechanism 125 configured to detect the position of the movable member 120 over the range of travel. The valve body 121 defines an internal valve cavity 126. The movable member 120 is axially movable over a range of travel with respect to the valve body 121. In embodiments, the movable member 120 is at least partially disposed within the internal valve cavity 126 over the range of travel. The position monitoring mechanism 125 is arranged with the movable member 120 and is configured to detect a position of the movable member 120 over the range of travel and to transmit a position signal indicative of the position of the movable member 120 detected by the position monitoring mechanism 125.

In the illustrated embodiment, the valve body 21 includes a nonmagnetic pressure vessel 131 that has an adapter portion 132 and a cage 134. A plurality of seal members 118, 119, 135, 136, 137, 138 are provided to help provide a sealing arrangement between the valve body 121 and the structure to or into which the hydraulic cartridge valve 112 is mounted.

The nonmagnetic pressure vessel 131 is threadedly engaged with the cage 134. The adapter portion 132 includes an external threaded surface 139 that is adapted to be threadedly engaged with a body, manifold, or other suitable component to allow the hydraulic cartridge valve 112 to be used in a hydraulic circuit. The pressure vessel 131 and the cage 134 are hollow and cooperate together to define the internal valve cavity 126 in the form of an axial bore.

The illustrated movable member 120 is disposed within the axial bore 126 defined by the valve body 121 and is configured to move axially over a range of travel with respect to the valve body 121, including with respect to the pressure vessel 131 and the cage 134. In the illustrated embodiment, the movable member 120 includes a nonmagnetic stem 154 and a valve metering spool 155. The stem 154 and the spool 155 are coupled together such that the engaged movement of the stem 154 toward the spool 155 causes the spool 155 to move, as well, and the engaged movement of the spool 155 toward the stem 154 causes the stem 154 to move. The stem 154 is disposed primarily within the pressure vessel 131, and the spool 155 is disposed primarily within the cage 34. The spool 155 is configured to selectively vary at least one flow path through the cage 134 as it moves over a range of axial travel.

The hydraulic cartridge valve 112 of FIG. 2 also include the position monitoring mechanism 125 in the form of a LVDT. The LVDT includes the nonmagnetic pressure vessel 131, an LVDT coil 181, and a magnetic target 182 which is coupled to the nonmagnetic stem 154 connected to the spool 155 such that axial movement of one of the nonmagnetic stem 154 (to which the target 182 is mounted) and the spool 155 correspondingly axially moves the other.

The LVDT coil 181 is mounted to the external surface of the nonmagnetic pressure vessel 131. The magnetic target 182 is disposed within the nonmagnetic pressure vessel 131 and is coupled to the movable member 120 (the nonmagnetic stem 154 in the illustrated embodiment) such that movement of the movable member 120 correspondingly moves the magnetic target 182. Within the nonmagnetic pressure vessel 131, the magnetic target 182 is moved up or down in response to the action of the movable member 120.

In the illustrated embodiment, the LVDT coil 181 includes three solenoid coils 183, 184, 185 placed end-to-end around a bobbin 187: a primary excitation coil 183, a first secondary sense coil 184, and a second secondary sense coil 185. The center coil comprises the primary excitation coil 183. The two outer coils comprise top and bottom secondary sense coils 184, 185. The primary excitation coil 183 is axially centered between the first and second secondary sense coils 184, 185. In embodiments, the primary excitation coil 183 is axially centered between a pair of identically wound secondary sense coils 184, 185 that are symmetrically spaced about the primary excitation coil 183. The bobbin 187 and the coil windings 183, 184, 185 are secured in a cylindrical stainless steel cylindrical shell 188. The LVDT 125 of FIG. 2 can be similar in other respect to the LVDT 25 of FIG. 1.

The operation of the valve 112 depicted in FIG. 2 will be readily apparent to one skilled in the art, particularly in view of the description of valve 12 of FIG. 1. Review of the FIGURES will make apparent to one skilled in the art other features and aspects of the present disclosure.

Embodiments of a hydraulic control system constructed according to principles of the present disclosure can be used to carry out a method of controlling a hydraulic cartridge valve using a position monitoring mechanism as described above. In embodiments, a method of controlling a hydraulic cartridge valve following principles of the present disclosure can be used with any embodiment of a hydraulic cartridge valve and/or any embodiment of a hydraulic control system constructed according to principles discussed herein.

In one embodiment, a method of controlling a hydraulic cartridge valve includes transmitting, by a position monitoring mechanism of a hydraulic cartridge valve, a position signal to a controller. The position signal is indicative of a position detected by the position monitoring mechanism of a movable member of the hydraulic cartridge valve. The movable member is axially movable over a range of travel with respect to a valve body of the hydraulic cartridge valve. The controller monitors the position signal to determine whether the movable member is detected to be at a desired set point. The controller selectively operates, based upon the position signal, an actuator of the hydraulic cartridge valve to axially move the position of the movable member to the desired set point.

In embodiments, the position monitoring mechanism comprises a linear variable differential transformer (LVDT). The LVDT includes a nonmagnetic pressure vessel of the valve body, an LVDT coil, and a magnetic target. The LVDT coil is mounted to an external surface of the nonmagnetic pressure vessel, and the magnetic target is disposed within the nonmagnetic pressure vessel and is coupled to the movable member such that movement of the movable member correspondingly moves the magnetic target. In at least some embodiments of a method following principles of the present disclosure, the method includes applying an electrical current to the LVDT coil to generate the position signal.

In at least some of such embodiments, the LVDT coil includes a primary excitation coil, a first secondary sense coil, and a second secondary sense coil. The primary excitation coil is axially centered between the first and second secondary sense coils. The LVDT coil is configured to indicate a direction of movement of the magnetic target via a flux differential between the first and second secondary sense coils and the induced voltage therein caused by the movement of the magnetic target relative to the LVDT coil. Applying the electrical current to the LVDT coil comprises energizing the primary excitation coil via an alternating current, and transmitting the position signal by the position monitoring mechanism comprises transmitting a differential AC voltage between the first and second secondary sense coils. The differential AC voltage varies with the axial position of the magnetic target with respect to the LVDT coil.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A hydraulic cartridge valve comprising:
   a valve body defining an internal valve cavity, the valve body including a tube assembly, a nonmagnetic pressure vessel, an adapter, and a cage, the tube assembly being connected to the nonmagnetic pressure vessel, the nonmagnetic pressure vessel being connected to the tube assembly and the adapter such that the nonmagnetic pressure vessel is interposed therebetween, the adapter being connected to the nonmagnetic pressure vessel and the cage such that the adapter is interposed therebetween, wherein the tube assembly, the pressure vessel, the adapter, and the cage are hollow and cooperate together to define the internal valve cavity in the form of an axial bore, wherein the cage defines a first port and a second port in fluid communication with the first port via the axial bore;

a movable member axially movable over a range of travel with respect to the valve body, the movable member at least partially disposed within the internal valve cavity over the range of travel, wherein the movable member comprises a nonmagnetic plunger and a metering spool, the nonmagnetic plunger disposed within the tube assembly, the pressure vessel, and the adapter, and the metering spool disposed within the adapter and the cage, the metering spool being axially movable with respect to the cage such that the metering spool is movable over a range of travel between a closed position, in which the metering spool prevents fluid flow from the second port to the first port, and an open position, in which the metering spool defines a fluid flow path between the second and the first port of the cage;

a position monitoring mechanism arranged with the movable member and configured to detect a position of the movable member over the range of travel and to transmit a position signal indicative of the position of the movable member detected by the position monitoring mechanism;

an actuator arranged with the movable member and configured to selectively move the movable member over the range of travel, the actuator comprises a solenoid assembly including a coil disposed around a valve actuator, the coil mounted to the tube assembly, and the valve actuator disposed within the axial bore of the valve body, the valve actuator being configured to move in response to an electrical current being applied to the coil, the valve actuator being arranged with the nonmagnetic plunger such that the movement of the valve actuator moves the movable member.

2. The hydraulic cartridge valve of claim 1, further comprising:

a spring arranged with the metering spool to bias the metering spool to the closed position;

wherein the solenoid assembly is configured such that, when the coil is energized, the metering spool moves from the closed position toward the open position in an amount proportional to the electrical current applied to the coil.

3. The hydraulic cartridge valve of claim 1, wherein the position monitoring mechanism is configured to convert the position of the movable member relative to a reference position into a proportional electrical signal containing phase and amplitude information.

4. The hydraulic cartridge valve of claim 1, wherein the position monitoring mechanism comprises a linear variable differential transformer (LVDT).

5. The hydraulic cartridge valve of claim 4, wherein the valve body includes a nonmagnetic pressure vessel, and wherein the LVDT includes the nonmagnetic pressure vessel, an LVDT coil, and a magnetic target, the LVDT coil being mounted to an external surface of the nonmagnetic pressure vessel, and the magnetic target being disposed within the nonmagnetic pressure vessel and being coupled to the movable member such that movement of the movable member correspondingly moves the magnetic target.

6. The hydraulic cartridge valve of claim 5, wherein the LVDT coil includes a primary excitation coil, a first secondary sense coil, and a second secondary sense coil, the primary excitation coil being axially centered between the first and second secondary sense coils, the LVDT coil being configured to indicate a direction of movement of the magnetic target via a flux differential between the first and second secondary sense coils and the induced voltage therein caused by the movement of the magnetic target relative to the LVDT coil.

7. The hydraulic cartridge valve of claim 6, wherein the position monitoring mechanism is configured to convert the position of the movable member relative to a reference position into a proportional electrical signal containing phase and amplitude information.

8. The hydraulic cartridge valve of claim 7, wherein the LVDT is mounted to the nonmagnetic pressure vessel such that the primary excitation coil is axially aligned with an axial center of the magnetic target when the spool is in a normal position with the actuator de-energized.

* * * * *